(12) United States Patent
Nakajima et al.

(10) Patent No.: US 10,860,205 B2
(45) Date of Patent: Dec. 8, 2020

(54) CONTROL DEVICE, CONTROL METHOD, AND PROJECTION SYSTEM

(71) Applicant: SONY CORPORATION, Tokyo (JP)

(72) Inventors: Yohei Nakajima, Kanagawa (JP); Masao Kondo, Kanagawa (JP); Hirotaka Tako, Kanagawa (JP); Daisuke Shiono, Tokyo (JP); Yoshiyasu Kubota, Kanagawa (JP); Yoshihito Ohki, Tokyo (JP); Yusuke Tsujita, Kanagawa (JP); Miho Yamada, Saitama (JP); Kenichi Yamaura, Nagano (JP); Hiroshi Nakayama, Tokyo (JP); Seiji Suzuki, Kanagawa (JP); Masanori Matsushima, Tokyo (JP); Taichi Nokuo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/486,046

(22) PCT Filed: Feb. 9, 2018

(86) PCT No.: PCT/JP2018/004568
§ 371 (c)(1),
(2) Date: Aug. 14, 2019

(87) PCT Pub. No.: WO2018/155234
PCT Pub. Date: Aug. 30, 2018

(65) Prior Publication Data
US 2020/0050355 A1     Feb. 13, 2020

(30) Foreign Application Priority Data
Feb. 24, 2017     (JP) ................. 2017-033509

(51) Int. Cl.
*G06F 3/0488*     (2013.01)
*G06F 3/0354*     (2013.01)
(Continued)

(52) U.S. Cl.
CPC ...... *G06F 3/04883* (2013.01); *G06F 3/03545* (2013.01); *G06F 3/041* (2013.01);
(Continued)

(58) Field of Classification Search
CPC .. G06F 3/04883; G06F 3/03545; G06F 3/041; G06F 3/16; G06F 3/1446; G06K 9/222; H04N 5/74
See application file for complete search history.

(56) References Cited

U.S. PATENT DOCUMENTS

| 2014/0253478 A1* | 9/2014 | Jeong ................ G06F 3/04883 345/173 |
| 2015/0138239 A1* | 5/2015 | Kim ...................... H04N 9/73 345/634 |

(Continued)

FOREIGN PATENT DOCUMENTS

| JP | 2003-219098 A | 7/2003 |
| JP | 2005-080121 A | 3/2005 |

(Continued)

OTHER PUBLICATIONS

International Search Report and Written Opinion of PCT Application No. PCT/JP2018/004568, dated May 1, 2018, 09 pages of ISRWO.

*Primary Examiner* — Michael Pervan
(74) *Attorney, Agent, or Firm* — Chip Law Group

(57) ABSTRACT

Provided is a control device that projects an image representing input information onto a projection surface so as to follow an input of the input information, with an effect in accordance with the type of the projection surface. As the
(Continued)

projection surface, a thin sheet material attached on a wall surface is prepared, for example. The color of the thin sheet material is a dark color, for example, and in time with projection of the image representing a handwritten character or picture, a sound, which will come out when the character or the picture is drawn with a chalk on a chalkboard, is output from a speaker installed on the back side of the projection surface.

12 Claims, 15 Drawing Sheets

(51) Int. Cl.
*G06F 3/041* (2006.01)
*G06F 3/16* (2006.01)
*G06K 9/22* (2006.01)
*H04N 5/74* (2006.01)

(52) U.S. Cl.
CPC ............... *G06F 3/16* (2013.01); *G06K 9/222* (2013.01); *H04N 5/74* (2013.01)

(56) References Cited

U.S. PATENT DOCUMENTS

| 2016/0353096 A1 | 12/2016 | Tomono et al. |
| 2017/0024031 A1 | 1/2017 | Ueda |
| 2019/0033985 A1* | 1/2019 | Ano ....................... G06F 3/1446 |

FOREIGN PATENT DOCUMENTS

| JP | 2007-266967 A | 10/2007 |
| JP | 2015-206854 A | 11/2015 |
| JP | 2016-162142 A | 9/2016 |
| JP | 2016-224225 A | 12/2016 |
| JP | 106210920 A | 12/2016 |

* cited by examiner

FIG. 4

| | t11 | t12 | t13 | t14 |
|---|---|---|---|---|
| INPUT FROM TABLET TERMINAL | p11, 1 | p12, 1 | p13, 1 | 1, fish |
| HANDWRITING IMAGE PROJECTED BY PROJECTOR | 21, p11 | 21, #21 | 21, #22 | 21, #23 |
| SOUND EFFECT | REPRODUCE ATTACK SOUND (MOMENTARILY) (EXAMPLE: SOUND OF CHALK MAKING CONTACT WITH CHALKBOARD) | REPRODUCE DRAWING SOUND (CONTINUOUSLY) (EXAMPLE: SOUND OF CHALK SCRATCHING CHALKBOARD) | REPRODUCE DRAWING SOUND (CONTINUOUSLY) (EXAMPLE: SOUND OF CHALK SCRATCHING CHALKBOARD) | REPRODUCTION STOPS |

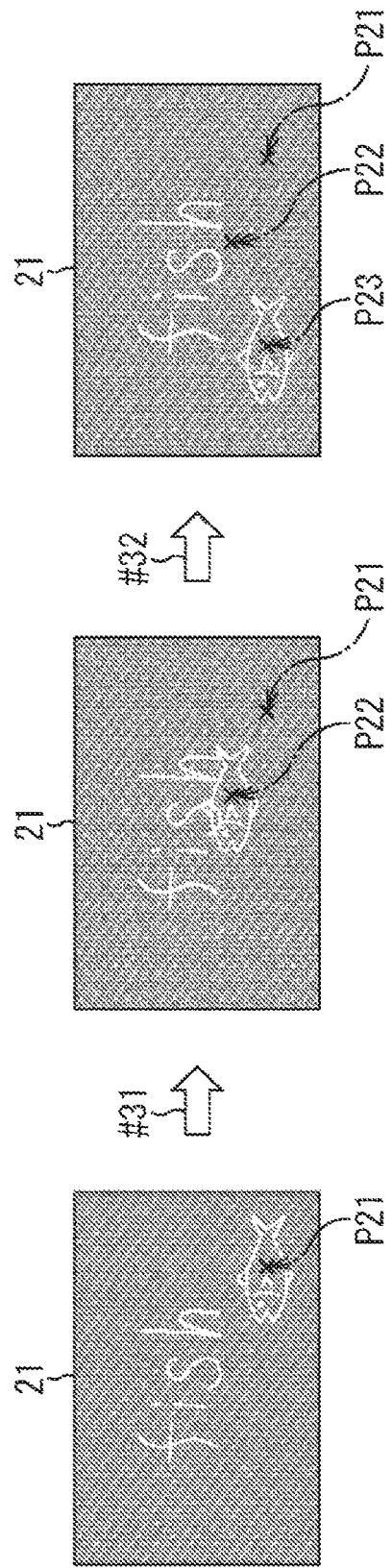

FIG. 9

| PROJECTION SURFACE | SOUND EFFECT | INFORMATION OF HANDWRITING |
|---|---|---|
| CHALKBOARD | SOUND EFFECT A | CHALK |
| BOARD | SOUND EFFECT B | PAINT OR THE LIKE |
| PAPER | SOUND EFFECT C | PENCIL OR PEN |
| ⋮ | ⋮ | ⋮ |

# CONTROL DEVICE, CONTROL METHOD, AND PROJECTION SYSTEM

CROSS REFERENCE TO RELATED APPLICATIONS

This application is a U.S. National Phase of International Patent Application No. PCT/JP2018/004568 filed on Feb. 9, 2018, which claims priority benefit of Japanese Patent Application No. JP 2017-033509 filed in the Japan Patent Office on Feb. 24, 2017. Each of the above-referenced applications is hereby incorporated herein by reference in its entirety.

TECHNICAL FIELD

The present technology relates to a control device, a control method, a program, and a projection system, and more particularly, relates to a control device, a control method, a program, and a projection system that are capable of, in a case where input information is to be presented by projecting an image, naturally attracting the attention of a person around a projection surface.

BACKGROUND ART

In recent years, spatial presentation using a projector is performed in many cases. An unusual presentation can be performed by displaying a CG image not only onto a building but also onto a variety of objects such as furniture or a daily commodity as a projection surface.

CITATION LIST

Patent Document

Patent Document 1: Japanese Patent Application Laid-Open No. 2016-162142

SUMMARY OF THE INVENTION

Problems to be Solved by the Invention

However, a space where an image is projected varies, and it has been difficult in some cases to attract the attention of a person around a projection surface only by projecting the image.

The present technology is made in consideration of such a situation, and enables, in a case where input information is to be presented by projecting the image, to naturally attract the attention of the person around the projection surface.

Solutions to Problems

A control device of an aspect of the present technology includes a process unit that causes an image representing input information to be projected onto a projection surface so as to follow an input of the input information, with an effect in accordance with a type of the projection surface.

There can be further provided a sound effect control unit that causes a sound effect synchronized with the image representing the input information to be output, as an effect in accordance with the type of the projection surface.

The sound effect control unit can cause a speaker to output the sound effect, the speaker being installed on a back side of the projection surface.

The sound effect control unit can cause the sound effect to be output, the sound effect varying in accordance with a time elapsed from start of input of the input information.

The sound effect control unit can cause the sound effect to be output, the sound effect being different in accordance with the type of the projection surface.

The process unit can determine the type of the projection surface on the basis of information regarding the projection surface, the information being obtained by performing a sensing process for the projection surface.

The information regarding the projection surface can include information indicating a material of the projection surface, and the effect can be made so as to correspond to the information indicating the material of the projection surface.

The input information is manually entered by a user and transmitted from a mobile terminal, and the process unit can cause the image representing a trajectory of the manual input to be projected.

There can be further provided a recognition unit that recognizes, on the basis of the input information, a character entered by the user. In this case, the process unit can cause the image, in which a picture moves, to be projected, the picture showing the recognition result of the character.

A projection system of another aspect of the present technology includes a control device having an image control unit that causes an image representing input information to be projected so as to follow an input of the input information, and a sound effect control unit that causes a sound effect in accordance with a type of a projection surface of the image to be output in synchronization with the image representing the input information, a projection device that projects the image representing the input information onto the projection surface, the image being supplied from the control device, and another projection device that projects a predetermined image onto a projection surface different from the projection surface, the predetermined image being supplied from the control device.

There can be further included a speaker installed on a back side of the projection surface onto which the image representing the input information is projected.

With the present technology, an image representing input information is projected onto a projection surface so as to follow an input of the input information, with an effect in accordance with a type of the projection surface.

Effects of the Invention

The present technology enables, in a case where the input information is to be presented by projecting the image, to naturally attract the attention of a person around the projection surface.

Note that the above-described effects are not necessarily limited and can be any effect described in the present disclosure.

BRIEF DESCRIPTION OF DRAWINGS

FIG. 4 illustrates another example of a handwriting image and a sound effect.

FIG. 5 illustrates an example of movement of an illustration of fish.

FIG. 9 illustrates examples of types of a projection surface and the sound effect.

MODE FOR CARRYING OUT THE INVENTION

The following describes an embodiment of the present technology. The description will be made in the following order.
1. Example of configuration of projection system
2. Example of handwriting image and sound effect
2-1. First example
2-2. Second example
3. Example of configuration and operation of control device
3-1. Configuration of control device
3-2. Operation of control device
4. Modification <<Example of Configuration of Projection System>>

Figure 1:
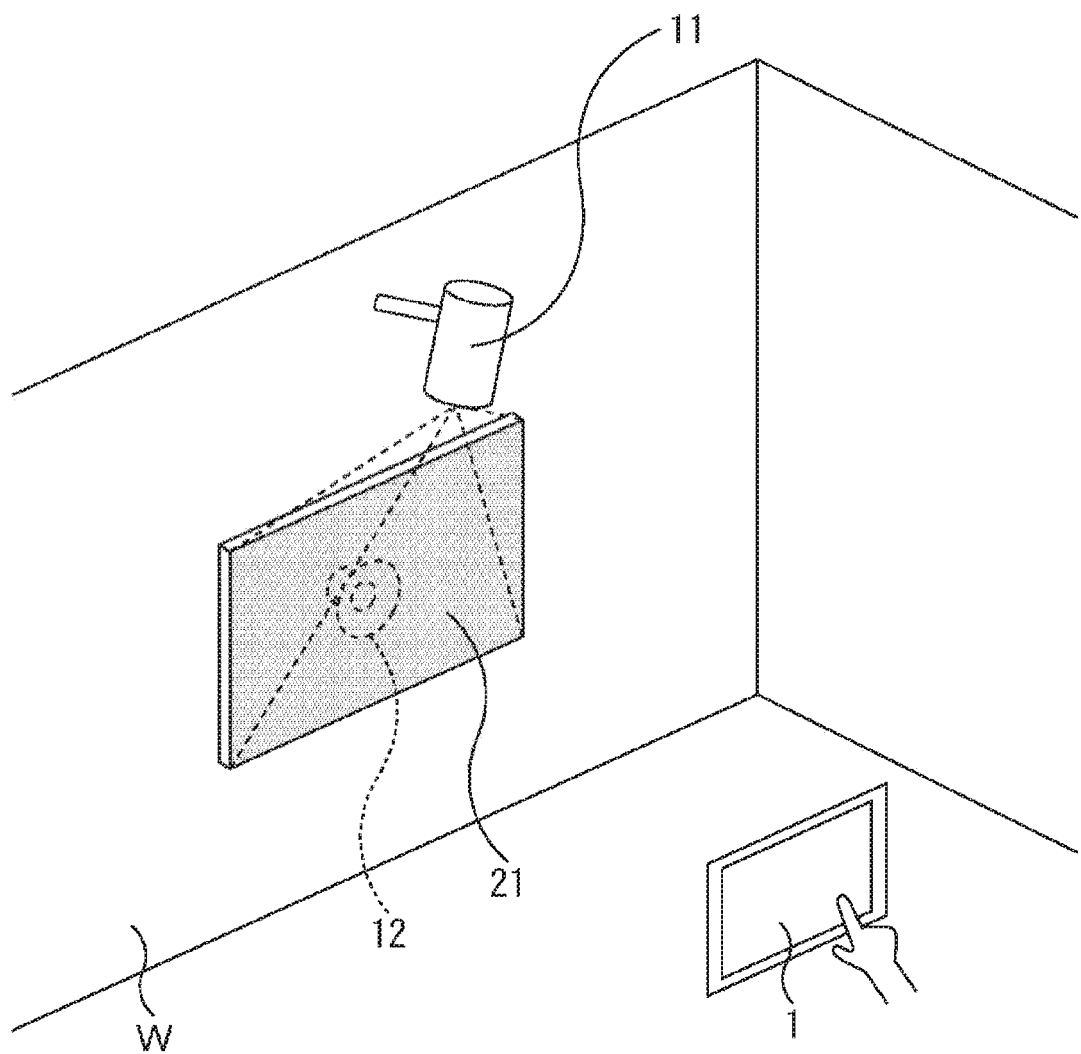
FIG. 1 illustrates an example of a use state of a projection system according to an embodiment of the present technology.

FIG. 1 illustrates an example of a use state of a projection system according to an embodiment of the present technology.

The projection system of FIG. 1 is used, for example, in a building of a public institution or in a store, and projects an image onto a projection board 21 including a thin sheet material, attached on a wall surface W. The surface of the projection board 21 is a dark color, with which the projection board presents a situation as if a small chalkboard is hung on the wall surface W.

Above the projection board 21, there is provided a projector 11 in which the light-illumination direction is directed to the projection board 21. The illumination range (projection range) of the projector 11 is adjusted so as to approximately coincide with the range of the projection board 21. Note that, as another possible aspect, the illumination range of the projector 11 may not coincide with the range of the projection board 21. For example, the size of the illumination range can be smaller than the size of the projection board 21, or can be larger than the size of the projection board 21 (in other words, the illumination range includes the projection board 21 and an extra area).

As illustrated with dashed lines, a speaker 12 is installed on the back side of the projection board 21. The speaker 12 is installed at a position not visible from the front of the projection board 21.

The projection system of FIG. 1 may also be used outdoors. In addition, a projection surface of the projector 11 may be the wall surface W itself instead of the projection board 21 attached on the wall surface W, or may be any other type of plane such as a floor surface or a top board of a table. The projection surface may also be any type of surface such as a surface of an automobile or a surface of a chair, which is not a plane. The installation positions of the projector 11 and the speaker 12 are changeable as appropriate depending on the position of the projection surface.

In the projection system of FIG. 1, projection content for the projector 11 is entered by using a tablet terminal 1. A body of the tablet terminal 1 is provided with a display in which a touch panel with a touch sensor is laminated. As illustrated in the bottom right of FIG. 1, a user of the tablet terminal 1 can enter a character, a picture, and the like by touching the display surface directly with a finger.

Information indicating input positions of the manual input made by the user is transmitted to a control device provided at a predetermined position. The control device causes the projector 11 to project an image representing the content entered by the user. The image projected by the projector 11 is a drawn image of a handwriting, and is updated and displayed substantially in real-time following the input operation of the user. Note that the handwriting mentioned here represents a trajectory of input positions of a manual input performed with a finger, a stylus pen, or the like.

In the following, an image projected by the projector 11 in response to an input of a user is referred to as a handwriting image as appropriate.

Furthermore, the control device causes the speaker 12 to output a sound effect synchronized with the handwriting image projected by the projector 11.

Figure 2:
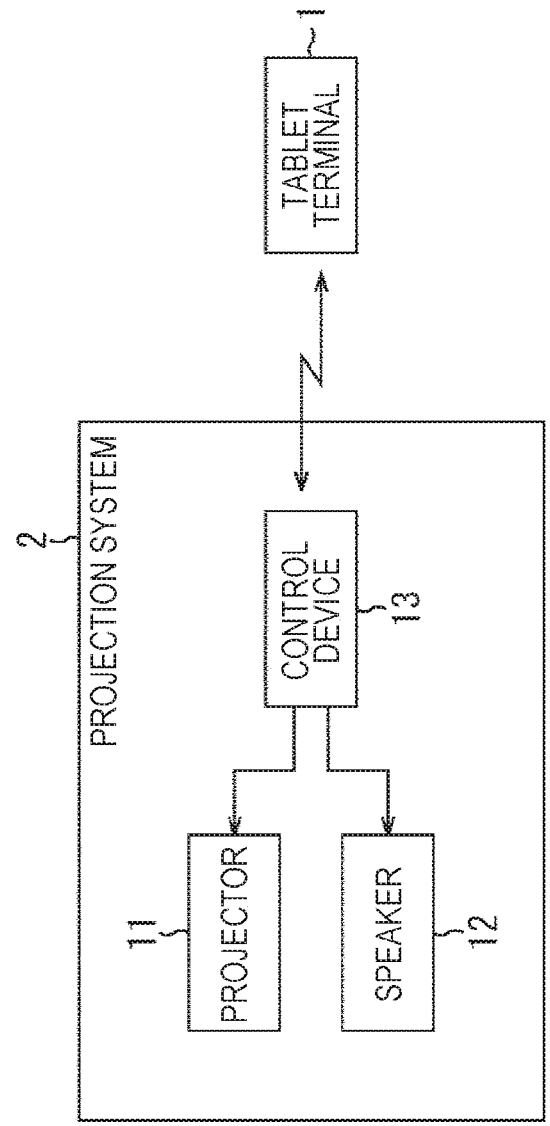
FIG. 2 is a block diagram illustrating an example of a configuration of the projection system.

In other words, a projection system 2, which is the projection system of FIG. 1, includes the projector 11, the speaker 12, and the control device 13 as illustrated in FIG. 2. With this system, the user can enter information remotely using the tablet terminal 1. Transmission and reception of information between the projector 11 and the control device 13, and between the speaker 12 and the control device 13 are performed by a wired communication, or by a standardized wireless communication such as a wireless local area network (LAN) and Bluetooth (registered trademark).

Thus, the projection system 2 projects entered information in real-time at a remote position, and outputs from the back side of a projection surface a sound effect in accordance with the projection. Consequently, a person around the projection surface notices that the handwriting image is being projected by looking in the direction in which the sound comes out, in response to the sound.

The user entering the information using the tablet terminal 1 can cause the person around the projection surface to naturally notice that the information is being presented. The projection system 2 is mainly used to present information entered in handwriting, to a person around the projection surface.

<<Example of Handwriting Image and Sound Effect>>

First Example

Figure 3:
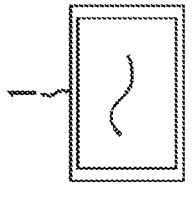
FIG. 3 illustrates an example of a handwriting image and a sound effect.

FIG. 3 illustrates an example of the handwriting image and the sound effect to be output by the projection system 2.

In FIG. 3, the upper row indicates a state of input to the tablet terminal 1 at each time. The middle row indicates a handwriting image at the corresponding time. The lower row indicates a sound effect to be output synchronized with the handwriting image.

In a case where, at a time t1, the user touches (makes contact with) a position p1 on the display of the tablet terminal 1 with a finger, the projection board 21 becomes a state in which a handwriting image with a position P1 as the input start position is projected. The position P1 on the projection board 21 corresponds to the position p1 on the display of the tablet terminal 1.

Furthermore, in synchronization with the handwriting image, the speaker 12 outputs, as a sound effect, an attack sound representing that a chalk is applied to a chalkboard. The attack sound is reproduced momentarily.

Subsequently, the person around the projection board 21, reacting to the attack sound and turning back, will be looking at the handwriting image to be updated. The user of the tablet terminal 1 continues the input by moving the finger without putting it off the display surface.

In a case where, at a time t2, the user has moved the finger to a position p2 on the display of the tablet terminal 1, the projection board 21 becomes a state in which a handwriting image of a curved line extended from the position P1 to a position P2 is projected, as indicated by the tip of an arrow #11. The position P2 on the projection board 21 corresponds to the position p2 on the display of the tablet terminal 1. In synchronization with the handwriting image of the curved line to be extended from the position P1 to the position P2, the speaker 12 keeps outputting, as a sound effect, a drawing sound representing a sound generated when a chalk is rubbed against a chalkboard.

In a case where, at a time t3, the user has moved the finger to a position p3 on the display of the tablet terminal 1, the projection board 21 becomes a state in which the handwriting image of the curved line further extended from the position P2 to a position P3 is projected, as pointed by the tip of an arrow #12. The position P3 on the projection board 21 corresponds to the position p3 on the display of the tablet terminal 1. In synchronization with the handwriting image of the curved line to be extended from the position P2 to the position P3, the speaker 12 keeps outputting the drawing sound as the sound effect.

In a case where, at a time t4, the user puts the finger off the position p3 on the display of the tablet terminal 1, the projection board 21 becomes a state in which the handwriting image having a wavy line with the input start position as the position P1 and the input end position as the position P3, as pointed by the tip of an arrow #13. When the handwriting extends to the position P3, the sound effect reproduction stops.

The handwriting is expressed with a partially diluted line like, for example, a line drawn with a chalk on a chalkboard. Together with the sound effect described above coming out from the projection surface, presentation of a situation as if an invisible person is drawing a line with a chalk on a chalkboard is achieved.

In a case where the projection system 2 is installed in a public space or the like for the purpose of presenting information, drawing the eyes of a surrounding person on the projection surface is important. The eyes of the surrounding person can be naturally turned to the projection surface by using the projection surface as a generation source to make the sound effect.

Furthermore, outputting the sound effect synchronized with the handwriting image enables to naturally notify the surrounding person that the information is updated continuously. Methods for notifying update of information include a method of reproducing an alert sound as performed in, for example, a smartphone, a tablet terminal, and the like. Unfortunately, such a method is taken to attract an attention of a person only momentarily, and not to attract the attention continuously. Outputting the sound effect in the manner as described above enables to notify that information is updated continuously.

Second Example

FIG. 4 illustrates another example of a handwriting image and a sound effect.

With reference to FIG. 4, a handwriting image and a sound effect in a case where a handwritten character is entered are described below. Redundant description with respect to that of FIG. 3 is omitted as necessary.

In a case where, at a time t11, a user touches a position p11 on the display of the tablet terminal 1 with a finger, the projection board 21 becomes a state in which a handwriting image with a position P11 as the input start position is projected. The position P11 on the projection board 21 corresponds to the position p11 on the display of the tablet terminal 1. Furthermore, the speaker 12 outputs, as a sound effect, an attack sound synchronized with the handwriting image.

In a case where, at a time t12, the user has moved the finger to a position p12 on the display of the tablet terminal 1 and completed writing an alphabetical character "f", the projection board 21 becomes a state in which a handwriting image of the alphabetical character "f" is projected, as pointed by the tip of an arrow #21. Furthermore, the speaker 12 keeps outputting a drawing sound as a sound effect in synchronization with the handwriting image of the appearing character "f".

In a case where, at a time t13, the user has moved the finger to a position p13 on the display of the tablet terminal 1 and completed writing an alphabetical character "h" following alphabetical characters "f", "i", and "s", the projection board 21 becomes a state in which a handwriting image of the alphabetical character "h" next to the alphabetical characters "f", "i", and "s" is projected, as pointed by the tip of an arrow #22. Furthermore, the speaker 12 keeps outputting the drawing sound as the sound effect in synchronization with the handwriting image of the appearing character "h".

In a case where, at a time t14, the user puts the finger off the position p13 on the display of the tablet terminal 1, the projection board 21 becomes a state in which a handwriting image of the handwritten characters "fish" is projected, as pointed by the tip of an arrow #23. When the drawing of the character "h" ends, the sound effect reproduction stops.

When the drawing of the character "h" ends, the control device 13 recognizes the characters "fish" manually entered, and an illustration I1 of fish appears near the characters "fish". The image of the illustration I1 is not information entered by the user in handwriting, but is an image generated automatically by the control device 13. As described above, a handwriting to be drawn is not limited to ones manually entered by the user.

The control device 13 manages illustration data in association with various characters. The illustration I1 of fish is an image represented by a line drawn with a chalk on a chalkboard.

As described above, the control device 13 can automatically generate and project images of various types of additional information such as characters and pictures related to the content entered by the user, and cause the characters and pictures to be projected in addition to the handwriting of the user. After the illustration I1 appears near the characters "fish", an image in which the illustration I1 of fish moves is projected.

FIG. 5 illustrates an example of the movement of the illustration I1 of fish.

As illustrated at the leftmost in FIG. 5, the illustration I1 that appears at a position P21 on the projection board 21 moves from the position P21 to a position P22 while taking a predetermined time, as pointed by the tip of an arrow #31. Furthermore, the illustration I1 moves from the position P22 to a position P23 while taking another predetermined time, as pointed by the tip of an arrow #32. As described above, an animation of a moving illustration may also be projected.

Figure 6A:
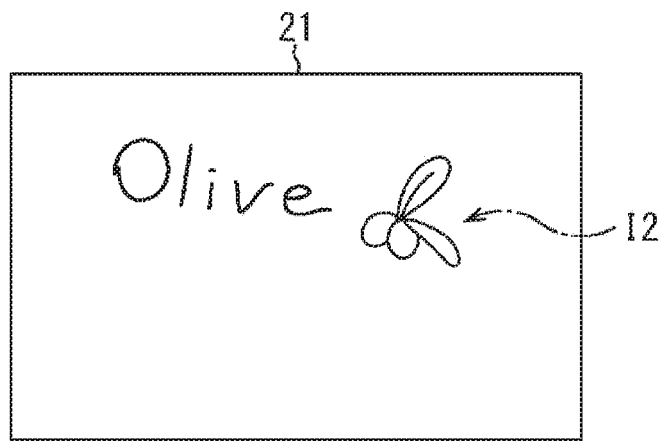
FIGS. 6A and 6B illustrate examples of illustrations.
Figure 6B:
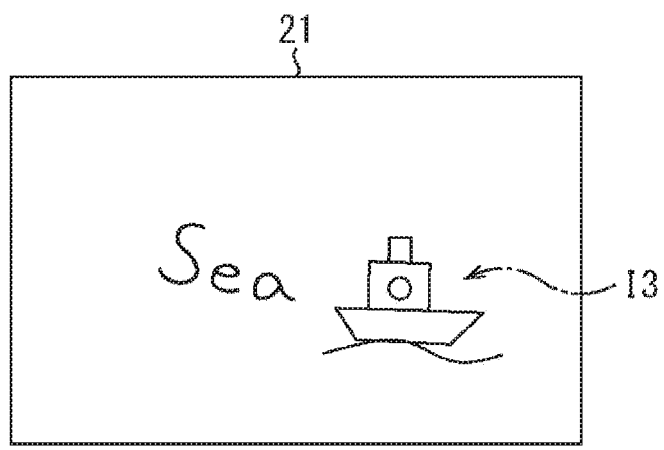

FIGS. 6A and 6B illustrate examples of illustrations that appear in response to input of handwritten characters.

In a case where characters "Olive" are entered as illustrated in FIG. 6A, a handwriting image in which an illustration 12 of an olive appears is projected. Furthermore, in a case where characters "Sea" are entered as illustrated in FIG. 6B, a handwriting image in which an illustration 13 of a ship appears is projected. After the illustrations appear, handwriting images in which the illustrations moves are projected as appropriate.

As described above, the projection system 2 achieves presentation of a situation as if an invisible person is drawing a picture or a character with a chalk on a chalkboard. The process performed by the control device 13 to make such a presentation as above is described later with reference to a flowchart.

<<Example of Configuration and Operation of Control Device>>

<Configuration of Control Device>

Figure 7:
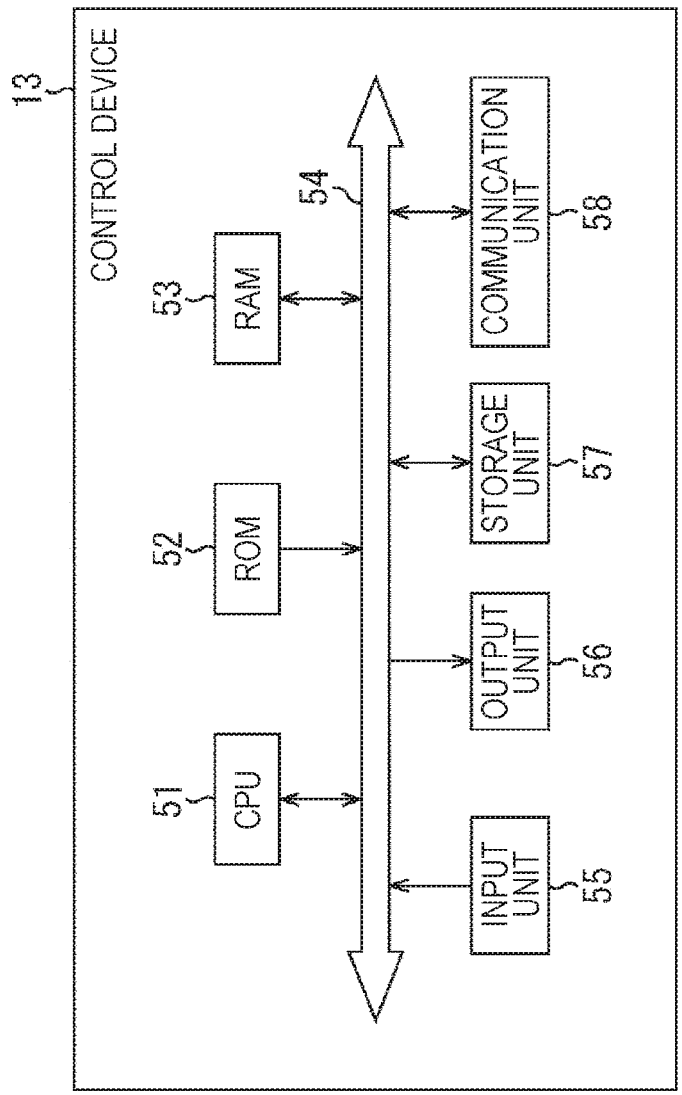
FIG. 7 is a block diagram illustrating an example of a hardware configuration of a control device.

FIG. 7 is a block diagram illustrating an example of a hardware configuration of the control device 13.

As illustrated in FIG. 7, the control device 13 includes a CPU 51, a ROM 52, a RAM 53, an input unit 55, an output unit 56, a storage unit 57, and a communication unit 58 that are connected via a bus 54.

The central processing unit (CPU) 51 executes a program, which is stored in, for example, the read only memory (ROM) 52, using the random access memory (RAM) 53, to control the entire operation of the control device 13.

The input unit 55 includes a keyboard, a mouse, and the like, and accepts an operation of a manager of the projection system.

The output unit 56 includes a display, a speaker, and the like, which are not illustrated. A signal of a handwriting image to be projected by the projector 11 and a signal of a sound effect to be output from the speaker 12 may be output from the output unit 56 instead of the communication unit 56. In this case, the output unit 56 functions as an interface to output a video signal of the handwriting image and an audio signal of the sound effect.

The storage unit 57 includes a hard disk, a flash memory, and the like. The storage unit 57 stores various types of information such as the program to be executed by the CPU 51, data to be used to project the handwriting image, and data of the sound effect.

The communication unit 58 transmits the data of the handwriting image to the projector 11, and transmits the data of the sound effect to the speaker 12, by a wired communication or a wireless communication. In addition, the communication unit 58 communicates with external equipment via the Internet as required.

Note that the tablet terminal 1 also has a configuration that is basically similar to the configuration of the control device 13 illustrated in FIG. 7

Figure 8:
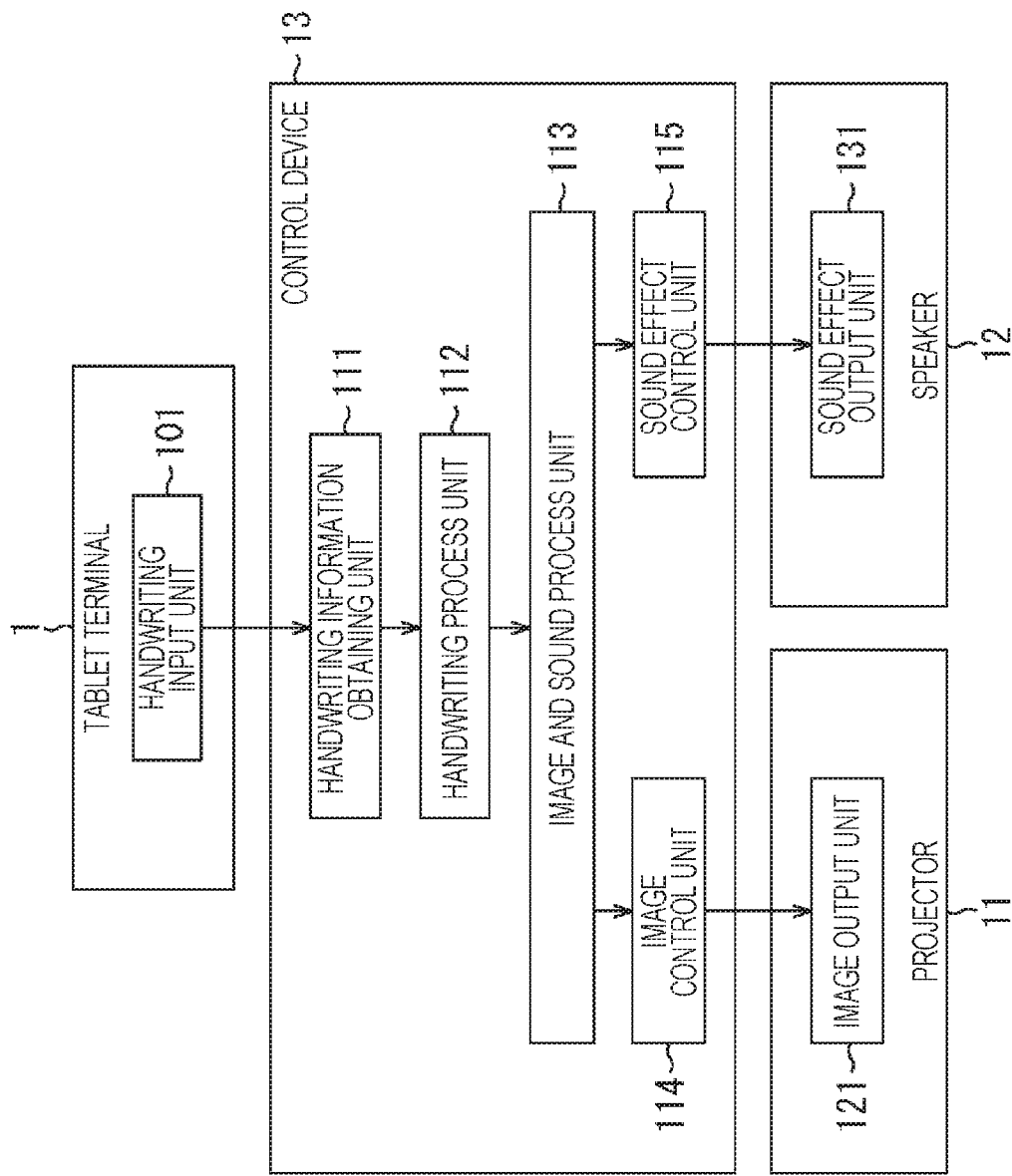
FIG. 8 is a block diagram illustrating an example of a function configuration of the control device.

FIG. 8 is a block diagram illustrating an example of a function configuration of the control device 13. At least one of the functional units of the control device 13 illustrated in FIG. 8 is achieved with a predetermined program executed by the CPU 51 of FIG. 7. FIG. 8 also illustrates a part of the configuration of each of the tablet terminal 1, the projector 11, and the speaker 12.

A handwriting input unit 101 of the tablet terminal 1 detects an input of the user made on the touch panel. As detecting the input of the user, the handwriting input unit 101 transmits handwriting information to the control device 13 via a communication unit of the tablet terminal 1 (a communication unit 103 later described in FIG. 13). For instance, information indicating coordinates of the input position at each time is transmitted as the handwriting information. The handwriting input unit 101 repeats transmitting the handwriting information from start of an input until end of the input.

In the control device 13, a handwriting information obtaining unit 111, a handwriting process unit 112, an image and sound process unit 113, an image control unit 114, and a sound effect control unit 115 are implemented.

The handwriting information obtaining unit 111 controls the communication unit 58 and obtains the handwriting information by performing a process such as receiving the handwriting information transmitted from the tablet terminal 1. The handwriting information obtaining unit 111 outputs the obtained handwriting information to the handwriting process unit 112.

The handwriting process unit 112 calculates coordinate information of the handwriting at each timing from the start of input to the end of input made on the projection board 21, on the basis of the handwriting information supplied from the handwriting information obtaining unit 111, and outputs the calculated information to the image and sound process unit 113.

In addition, at input of a character by the user, the handwriting process unit 112 recognizes the entered character on the basis of the handwriting information. Thus, the handwriting process unit 112 functions as a recognition unit to recognize a character entered by the user.

The handwriting process unit 112 obtains, after recognition of the character, information of an illustration corresponding to the recognized character, and outputs coordination information indicating a position to display the illustration, to the image and sound process unit 113. The handwriting process unit 112 also outputs to the image and sound process unit 113 coordinate information of various types of additional information besides the illustration, the additional information being presented in addition to the information entered by the user of the tablet terminal 1.

As described above, the handwriting process unit 112 holds information for recognizing characters, and manages various types of additional information such as illustrations in association with recognition results of characters. Such additional information may also be obtained from external equipment connected via the Internet.

The image and sound process unit 113 analyzes the coordinate information supplied from the handwriting process unit 112 to generate a handwriting image. In addition, the image and sound process unit 113 generates a sound effect synchronized with the handwriting image, in accordance with a type of the projection board 21 to be the projection surface.

FIG. 9 illustrates examples of types of the projection surface.

The examples in FIG. 9 indicate a chalkboard, a board, and a paper as the types of the projection surface, and sound effects A, B, and C as the sound effects corresponding to the above types, respectively.

The sound effect A is data of a sound effect (an attack sound and a drawing sound) representing a sound to come out when a line is drawn with a chalk on a chalkboard. The sound effect B is data of a sound effect representing a sound to come out when a line is drawn with paint or the like on a board surface. The sound effect C is data of a sound effect representing a sound to come out when a line is drawn with a pencil or a pen on a paper.

As described above, the image and sound process unit 113 manages data of sound effects corresponding to types (materials) of various projection surfaces. For instance, the user of the tablet terminal 1 selects a type of the projection surface in advance before projection of a handwriting image starts. The image and sound process unit 113 generates a sound effect by using the data corresponding to the type of the projection surface selected by the user of the tablet terminal 1.

In addition, the examples in FIG. 9 indicate information of handwritings in association with the types of the projection surface. The information of handwritings is used for selecting a type of a line for a handwriting to be drawn in the handwriting image. Chalk, paint or the like, and pencil or pen are indicated as the information of handwritings corresponding to the types of the chalkboard, the board, and the paper, respectively.

As described above, the image and sound process unit 113 also manages information of handwritings corresponding to types (materials) of various projection surfaces. The handwriting image is generated also by using the data corresponding to the type of the projection surface. A type of a projection surface is not set by the user of the tablet terminal 1, but may also be set automatically by the control device 13, by means of analyzing an image captured by a camera installed in the projector 11. The content of FIG. 9 is stored in a predetermined recording medium by the storage unit 57 as, for example, a database in which pieces of information including the types of the projection surfaces, the sound effects, and the handwritings are associated with each other.

The image and sound process unit 113 outputs data of the handwriting image to the image control unit 114, and outputs data of the sound effect generated in accordance with the type of the projection board 21 to the sound effect control unit 115.

The image control unit 114 reproduces the data supplied from the image and sound process unit 113. The image control unit 114 controls the communication unit 58 to transmit the data of the handwriting image to the projector 11, and causes the projector 11 to project the handwriting image.

The sound effect control unit 115 reproduces the data supplied from the image and sound process unit 113. The sound effect control unit 115 controls the communication unit 58 to transmit the data of the sound effect to the speaker 12, and causes the speaker 12 to output the sound effect.

The handwriting information obtaining unit 111, the handwriting process unit 112, the image and sound process unit 113, the image control unit 114, and the sound effect control unit 115 configure a process unit that causes the image to be projected so as to follow an input of the handwriting information as the input information, with the sound effect in accordance with the projection surface.

An image output unit 121 of the projector 11 determines whether or not the data of the handwriting image is updated, and receives the data of the handwriting image transmitted from the control device 13. The image output unit 121 causes the handwriting image to be projected onto the projection board 21 on the basis of the received data.

A sound effect output unit 131 of the speaker 12 determines whether or not the sound effect is updated, and receives the data of the sound effect transmitted from the control device 13. The sound effect output unit 131 causes the sound effect to be output from the speaker 12 on the basis of the received data.

<Operation of Control Device>

Figure 10:
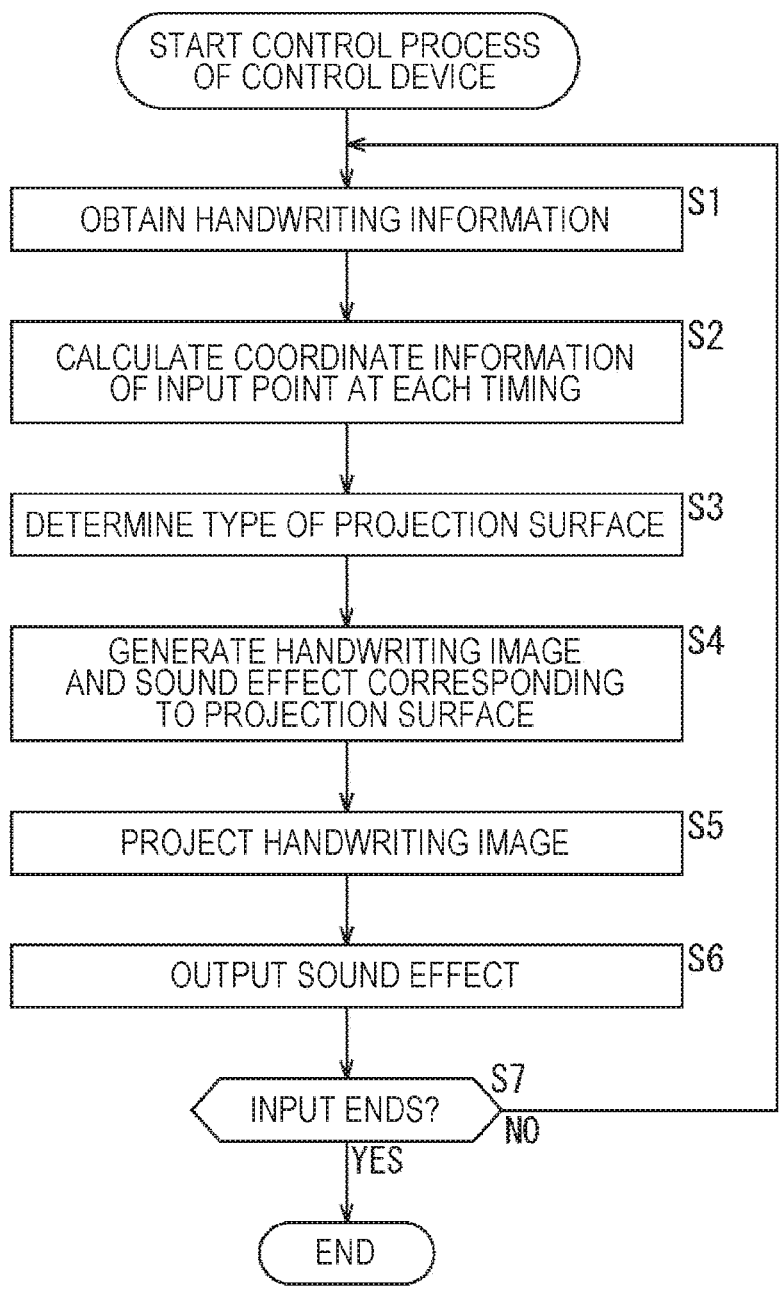
FIG. 10 is a flowchart to explain control processes of the control device.

In the following, a control process of the control device 13 for controlling projection of the handwriting image and output of the sound effect is described with reference to a flowchart of FIG. 10. The process of FIG. 10 starts when the tablet terminal 1 is operated and the handwriting information is transmitted from the tablet terminal 1.

In step S1, the handwriting information obtaining unit 111 receives the handwriting information transmitted from the tablet terminal 1.

In step S2, the handwriting process unit 112 calculates the coordinate information of the handwriting at each timing from the start of input to the end of input on the basis of the handwriting information obtained from the handwriting information obtaining unit 111.

In step S3, the image and sound process unit 113 determines the type of the projection surface. For instance, the image and sound process unit 113 determines the type of the projection surface by reading information set in advance by the user.

Alternatively, the image and sound process unit 113 determines the type of the projection surface by analyzing an image captured by a camera installed in the projector 11. In other words, in this case, the image and sound process unit 113 performs sensing for the projection surface to obtain information regarding the projection surface, and determines the type of the projection surface on the basis of the information regarding the projection surface. The information regarding the projection surface mentioned here includes information indicating the material of the projection surface.

Note that in a case where the projection range includes an area other than the projection board 21 (in other words, areas of a plurality of types and materials), the type of the projection surface may be determined for each area. In this case, it may also be possible to identify the handwriting information in terms of to which area the handwriting is entered, and add an effect according to the type corresponding to the area where the handwriting is entered.

In step S4, the image and sound process unit 113 analyzes the information supplied from the handwriting process unit 112 to generate a handwriting image, and generates a sound effect in accordance with the type of the projection surface.

In step S5, the image control unit 114 transmits the data of the handwriting image generated by the image and sound process unit 113, to the projector 11, and causes the projector 11 to project the handwriting image.

In step S6, the sound effect control unit 115 transmits the data of the sound effect generated by the image and sound process unit 113, to the speaker 12, and causes the speaker 12 to output the sound effect.

In step S7, the handwriting information obtaining unit 111 monitors the information transmitted from the tablet terminal 1, to determine whether or not input of the user has ended. In a case where it is determined that the input of the user is not ended because the handwriting information is still continuously transmitted, the control process returns to step S1 to repeat the process described above.

In a case where it is determined that the input of the user is ended in step S7, the process ends.

With the above-described process, the user of the tablet terminal 1 can enter a character or a picture in handwriting and cause an image representing the entered content to be projected with an effect in accordance with the type of the projection surface.

<<Modification>>

<Modification of Configuration of Projection System>

It is possible to appropriately change in which device each configuration in FIG. 8 is implemented.

Figure 11:
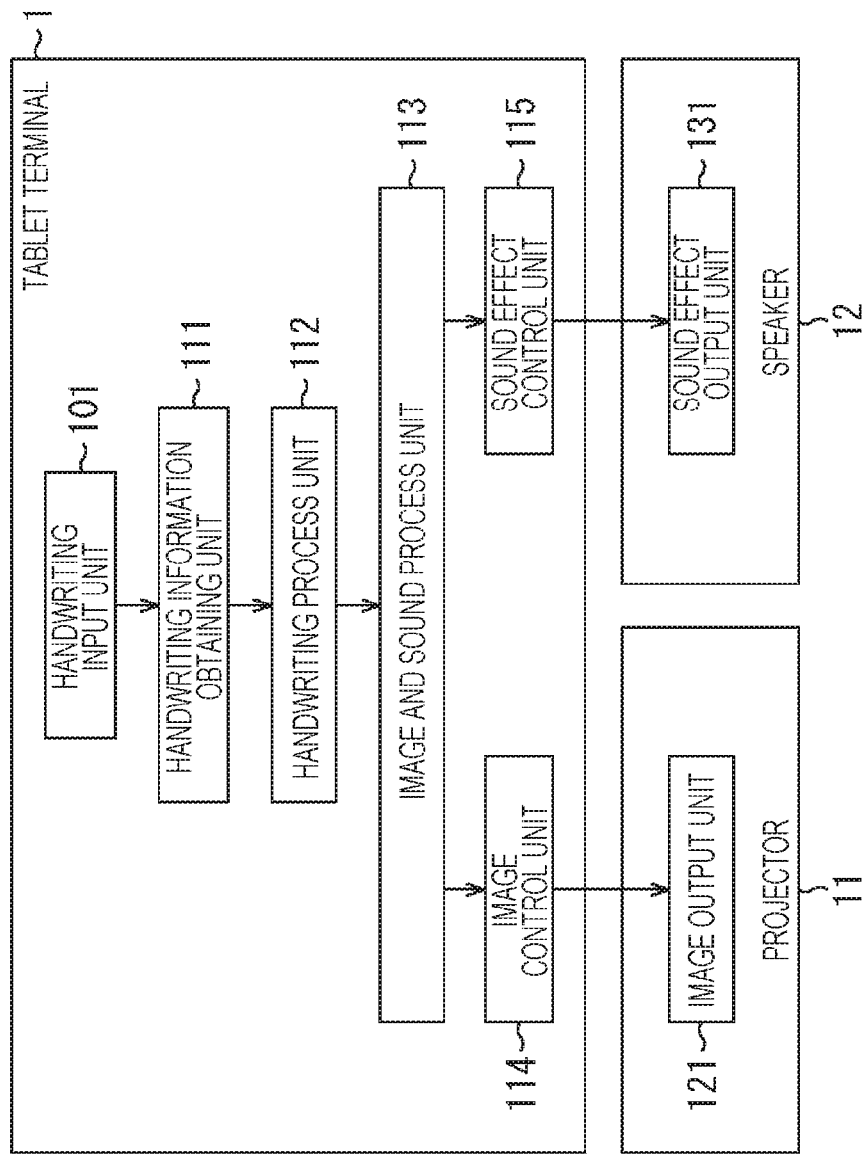
FIG. 11 illustrates an example of a function configuration of the projection system.

FIG. 11 illustrates an example of a function configuration of the projection system 2.

In the example of FIG. 11, the handwriting information obtaining unit 111, the handwriting process unit 112, the image and sound process unit 113, the image control unit 114, and the sound effect control unit 115 are implemented in the tablet terminal 1. Thus, the tablet terminal 1 can be equipped with the functions of the control device 13.

Figure 12:
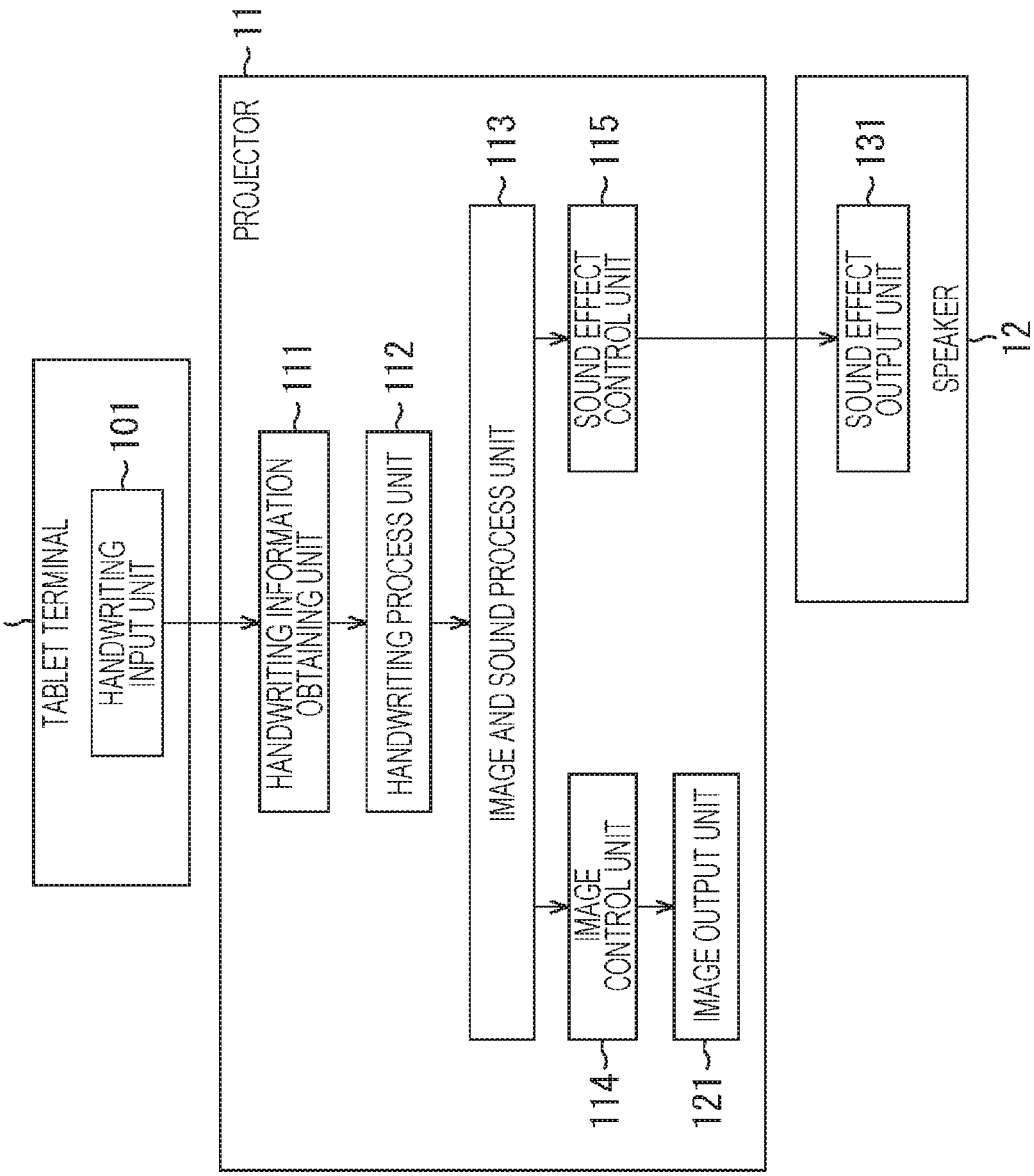
FIG. 12 illustrates an example of a function configuration of the projection system.

FIG. 12 illustrates further another example of a function configuration of the projection system 2.

In the example of FIG. 12, the handwriting information obtaining unit 111, the handwriting process unit 112, the image and sound process unit 113, the image control unit 114, and the sound effect control unit 115 are implemented in the projector 11. Thus, the projector 11 can be equipped with the functions of the control device 13.

The control device 13 is not required in a case where the projection system 2 has the configuration illustrated in FIG. 11 or FIG. 12.

Note that the configuration of the control device 13 illustrated in FIG. 8 may also be implemented with a plurality of devices. In this case, the plurality of devices that share and implement the configuration of the control device 13 illustrated in FIG. 8 is connected via a network.

The control device 13 may also be installed on the Internet so that communication between the tablet terminal 1 and the control device 13, communication between the projector 11 and the control device 13, and communication between the speaker 12 and the control device 13 are performed via the Internet.

Figure 13:
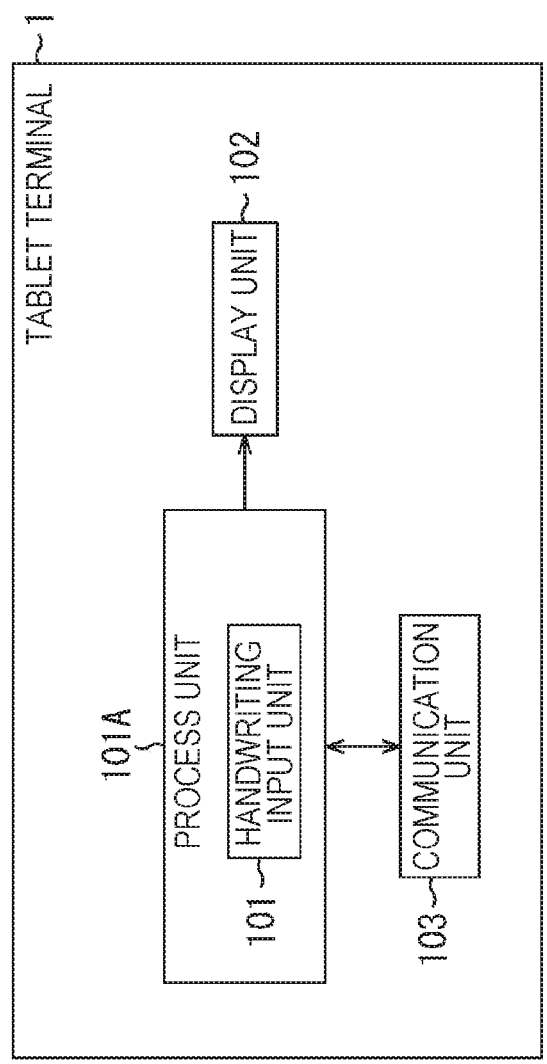
FIG. 13 is a block diagram illustrating an example of a configuration of a tablet terminal.

FIG. 13 is a block diagram illustrating an example of a configuration of the tablet terminal 1 having the above-described handwriting input unit 101.

As illustrated in FIG. 13, the tablet terminal 1 includes a process unit 101A having the handwriting input unit 101, a display unit 102, and a communication unit 103.

The process unit 101A controls the entire operation of the tablet terminal 1. For instance, the process unit 101A detects an input of the user made on the touch panel, and uses the handwriting input unit 101 to transmit handwriting information to the control device 13. In addition, the process unit 101A generates an image corresponding to the handwriting information, and makes the display unit 102 display the image.

The display unit 102 as the above-described display displays the image corresponding to the handwriting information supplied from the process unit 101A.

The communication unit 103 transmits the handwriting information to the control device 13 in accordance with the control of the handwriting input unit 101 of the process unit 101A.

Figure 14:
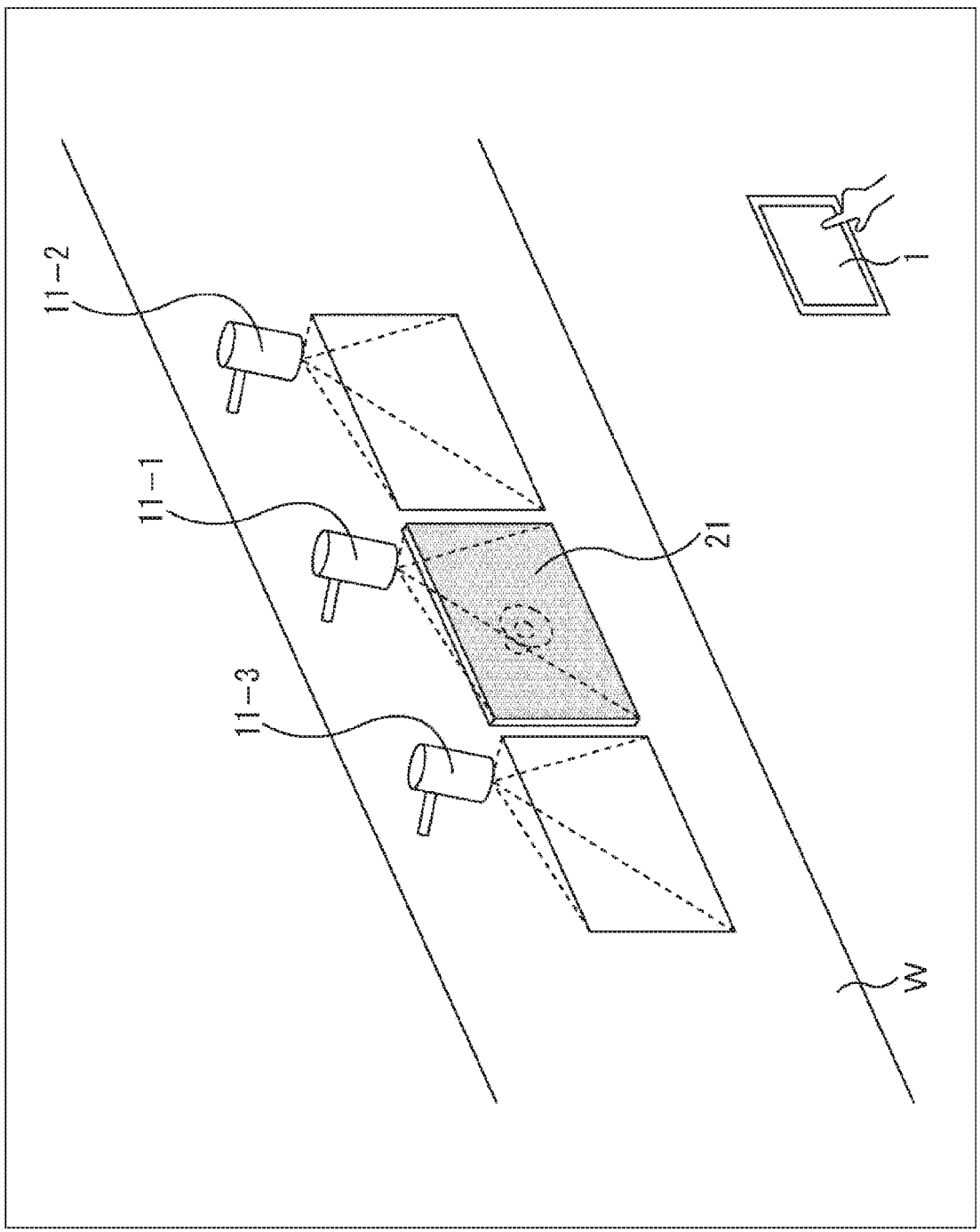
FIG. 14 illustrates an example of another use state of the projection system.

FIG. 14 illustrates an example of another use state of the projection system.

In the example of FIG. 14, three projectors, which are projectors 11-1 to 11-3, are installed on the wall surface W as the projectors to project content entered in the tablet terminal 1.

The projector 11-1 projects, similarly to the projector 11 above, an image onto the projection board 21. The projector 11-2 and the projector 11-3 installed on the right and left with the projector 11-1 in between project images onto the wall surface W. These projectors are installed on the wall surface W so that the projection surfaces closely align.

The control device 13 can coordinate the projectors 11-1 to 11-3 to cause a single image to be projected. For instance, the control device 13 can control and coordinate the projectors 11-1 to 11-3 by communication, and cause an image of the illustration I1 of fish to be projected, so as to move to a position on the projection surface of the projector 11-3, the image appearing on the projection board 21 after the recognition of the characters as described above.

In this case, the projector 11-1 projects a handwriting image representing the information entered in the tablet terminal 1, and the projectors 11-2 and 11-3 project a predetermined image coordinating with the projection content of the projector 11-1.

In a case where an image in which the illustration of fish moves across a plurality of projection surfaces is projected, the handwriting of the illustration of fish may be changed in real-time in accordance with the area onto which the moving illustration of fish is projected. For instance, projection of the illustration of fish within a chalkboard may be drawn by using a handwriting with a chalk, and when a white wall surface is projected, drawing is performed by using a handwriting with a black felt pen.

The projectors 11-2 and 11-3 may also have a speaker on the back side of the projection surface, to enable a sound effect to be output from the speaker on the back side of each projection surface in synchronization with the image. In this case, since the material of the projection surface used in the projector 11-1 is different from the materials of the projection surfaces used in the projectors 11-2 and 11-3, different types of sound effect data are used between outputting a sound effect synchronized with the handwriting image projected by the projector 11-1 and outputting a sound effect synchronized with to the image projected by the projectors 11-2 and 11-3.

As described above, a plurality of projectors can be installed in the projection system.

Other Examples

Although the information to be projected by the projector 11 has been entered by using the tablet terminal 1, input may also be made by using another device such as a PC or a smartphone.

In addition, although mainly the cases of projecting the information that has been manually entered have been described, any means such as a keyboard or a voice may be used for entering information to be projected.

Although a picture represented by the character is projected as additional information, content to be projected as additional information can be different as appropriate. For instance, additional information to be projected may be a photograph (an image), a moving picture, a website screen, or an advertisement that is related to the entered characters.

An effect in accordance with the type of the projection surface may be reflected also on the display of the handwriting on the tablet terminal 1. In this case, the control device 13, for example, transmits the information of the type of the projection surface to the tablet terminal 1, the information of the type being determined by the control device 13 The process unit 101A of the tablet terminal 1 causes a handwriting image to be displayed and a sound effect to be output, with an effect in accordance with the type of the projection surface, on the basis of the type information transmitted from the control device 13. The control device 13 may directly transmit to the tablet terminal 1 the data of the handwriting image itself and the sound effect itself with the effect.

Information directly entered in a projection range by the user may also be projected. In this case, an RGB camera or a depth sensor to perform sensing on an area including the projection range is installed in the projection system 2. On the basis of a result of the sensing performed by the RGB camera, the depth sensor, or other equipment, information regarding the operation of the user, such as which parts are touched by the user's finger or hand in the projection range, is obtained. The obtained information is then used to perform a process similar to that in the case of using the handwriting information transmitted from the tablet terminal 1. An input by using the tablet terminal 1 and a direct input in the projection range may be made possible for use at the same time.

<Example of Configuration of Computer>

The series of the processes described above may be performed by means of hardware, or by means of software. In a case of performing the series of the processes by means of software, a program that configures the software is installed in a computer built into a specialized hardware, a personal computer for general purpose use, or the like, from a program recording medium.

Figure 15:
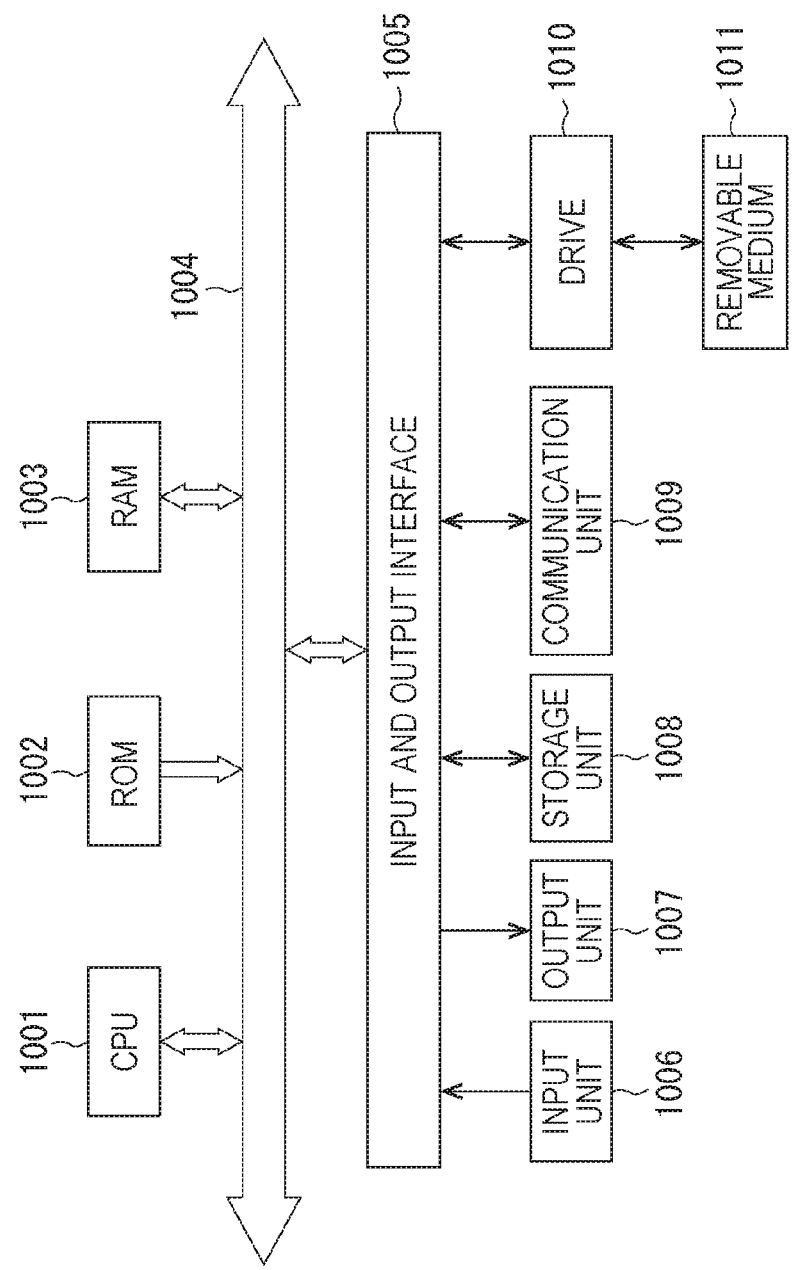
FIG. 15 is a block diagram illustrating an example of a configuration of a computer.

FIG. 15 is a block diagram illustrating an example of a hardware configuration of the computer that performs the series of the processes described above by using the program.

A CPU 1001, a ROM 1002, and a RAM 1003 are connected with each other via a bus 1004.

An input and output interface 1005 is further connected with the bus 1004. An input unit 1006 including a keyboard, a mouse, and the like, and an output unit 1007 including a display, a speaker, and the like are connected with the input and output interface 1005. In addition, a storage unit 1008 including a hard disk, a non-volatile memory, and the like, a communication unit 1009 including a network interface and the like, and a drive 1010 to drive a removable medium 1011 are connected with the input and output interface 1005.

In the computer configured as described above, the series of the processes described above are performed in a manner that the CPU 1001 loads the program stored in, for example, the storage unit 1008, to the RAM 1003 via the input and output interface 1005 and the bus 1004, and then executes the loaded program.

The program to be executed by the CPU 1001 is provided by, for example, being recorded in the removable medium 1011, or via a wired or wireless transmission medium such as a local area network, the Internet, or a digital broadcasting, and is installed in the storage unit 1008.

Note that the program to be executed by the computer may be a program in which the processes are sequentially performed in the order described in this specification, or may be a program in which the processes are performed in parallel, or at each required timing such as when being called.

In this specification, a system means an aggregation of a plurality of components (such as devices and modules (parts)), and the components need not to be present in a single housing all together. Therefore, a plurality of devices that are placed in different housings and connected with each other via a network, and a single device in which a plurality of modules is placed in a single housing, are both the system.

The embodiment of the present technology is not limited to the above-described embodiments. Various modifications can be made within a scope not deviating from the gist of the present technology.

For instance, the present technology can be achieved in a configuration in a form of cloud computing in which a single function is divided and performed by a plurality of devices in cooperation via a network.

In addition, the individual steps described in the flowchart above can be performed by not only a single device but also by a plurality of devices.

Furthermore, in a case where a single step includes a plurality of processes, the plurality of processes included in the single step can be performed not only by a plurality of devices but also by a single device.

Note that the effects described in this specification are only examples, which are not limited, and other effects may be present.

<Example of Combination of Configuration>

The present technology can also be achieved in a configuration described below.

(1)

A control device including a process unit that causes an image representing input information to be projected onto a projection surface so as to follow an input of the input information, with an effect in accordance with a type of the projection surface.

(2)

The control device according to (1) above further including a sound effect control unit that causes a sound effect synchronized with the image representing the input information to be output, as an effect in accordance with the type of the projection surface.

(3)

The control device according to (2) above in which the sound effect control unit causes a speaker to output the sound effect, the speaker being installed on a back side of the projection surface.

(4)

The control device according to (2) or (3) above in which the sound effect control unit causes the sound effect to be output, the sound effect varying in accordance with a time elapsed from start of input of the input information.

(5)

The control device according to any of (2) to (4) above in which the sound effect control unit causes the sound effect to be output, the sound effect being different in accordance with the type of the projection surface.

(6)

The control device according to any of (1) to (5) above in which the process unit determines the type of the projection surface on the basis of information regarding the projection surface, the information being obtained by performing a sensing process for the projection surface.

(7)

The control device according to (6) above in which the information regarding the projection surface includes information indicating a material of the projection surface, and the effect corresponds to the information indicating the material of the projection surface.

(8)

The control device according to any of (1) to (7) above in which the input information is manually entered by a user and transmitted from a mobile terminal, and the process unit causes the image representing a trajectory of the manual input to be projected.

(9)

The control device according to (8), further including a recognition unit that recognizes, on the basis of the input information, a character entered by the user, in which the process unit causes the image, in which a picture moves, to be projected, the picture showing a recognition result of the character.

(10)

A control method including a step of causing an image representing input information to be projected onto a projection surface so as to follow an input of the input information, with an effect in accordance with a type of the projection surface.

(11)

A program that causes a computer to perform a process including a step of causing an image representing input information to be projected onto a projection surface so as to follow an input of the input information, with an effect in accordance with a type of the projection surface.

(12)

A projection system including a control device having an image control unit that causes an image representing input information to be projected so as to follow an input of the input information, and a sound effect control unit that causes a sound effect in accordance with a type of a projection surface of the image to be output in synchronization with the image representing the input information, a projection device that projects the image representing the input information onto the projection surface, the image being supplied from the control device, and another projection device that projects a predetermined image onto a projection surface different from the projection surface, the predetermined image being supplied from the control device.

(13)

The projection system according to (12) above, further including a speaker installed on a back side of the projection surface onto which the image representing the input information is projected.

REFERENCE SIGNS LIST

1 Tablet terminal
11 Projector
12 Speaker
13 Control device
101 Handwriting input unit
111 Handwriting information obtaining unit
112 Handwriting process unit
113 Image and sound process unit
114 Image control unit
115 Sound effect control unit
121 Image output unit
131 Sound effect output unit

The invention claimed is:

1. A control device, comprising:
a central processing unit (CPU) configured to:
execute a sensing process for a projection surface;
obtain information regarding the projection surface based on the execution of the sensing process for the projection surface;
determine a first type of the projection surface based on the information regarding the projection surface;
control projection of an image representing input information onto the projection surface, such that the projection of the image representing the input information follows an input of the input information,
wherein the projection of the image representing the input information is based on the first type of the projection surface; and
control, based on the first type of the projection surface, output of a first sound effect in synchronization with the image representing the input information.

2. The control device according to claim 1, wherein
the CPU is further configured to control a speaker to output the first sound effect, and
the speaker is on a back side of the projection surface.

3. The control device according to claim 1, wherein
the CPU is further configured to vary the first sound effect based on a time elapsed from start of the input of the input information.

4. The control device according to claim 1, wherein
the CPU is further configured to control, based on a second type of the projection surface, output of a second sound effect in synchronization with the image representing the input information, and
the first sound effect is different from the second sound effect.

5. The control device according to claim 1, wherein
the information regarding the projection surface includes information indicating a material of the projection surface, and
the first sound effect corresponds to the information indicating the material of the projection surface.

6. The control device according to claim 1, wherein
the input information is based on a user input on a mobile terminal, and
the CPU is further configured to:
receive the input information from the mobile terminal; and
control the projection of the image representing a trajectory of the user input.

7. The control device according to claim 6, the CPU is further configured to:
recognize, based on the input information, a character entered by a user of the mobile terminal; and
control the projection of the image that includes a moving picture indicating a result of the recognition of the character.

8. A control method, comprising:
in a control device:
executing, by a central processing unit (CPU) of the control device, a sensing process for a projection surface;
obtaining, by the CPU, information regarding the projection surface based on the execution of the sensing process for the projection surface;
determining, by the CPU, a type of the projection surface based on the information regarding the projection surface;
controlling, by the CPU, projection of an image representing input information onto the projection surface, such that the projection of the image representing the input information follows an input of the input information, wherein the projection of the image representing the input information is based on the type of the projection surface; and controlling, by the CPU based on the type of the projection surface, output of a sound effect in synchronization with the image representing the input information.

9. A non-transitory computer-readable medium having stored thereon computer-executable instructions, which when executed by a processor, cause the processor to execute operations, the operations comprising:

executing a sensing process for a projection surface;

obtaining information regarding the projection surface based on the execution of the sensing process for the projection surface;

determining a type of the projection surface based on the information regarding the projection surface;

controlling projection of an image representing input information onto the projection surface, such that the projection of the image representing the input information follows an input of the input information, wherein the projection of the image representing the input information is based on the type of the projection surface; and controlling, based on the type of the projection surface, output of a sound effect in synchronization with the image representing the input information.

10. A projection system, comprising:

a control device that includes a central processing unit (CPU) configured to:

execute a sensing process for a first projection surface;

obtain information regarding the first projection surface based on the execution of the sensing process for the first projection surface;

determine a type of the first projection surface based on the information regarding the first projection surface;

control projection of an image representing input information onto the first projection surface, such that the projection of the image representing the input information follows an input of the input information; and control, based on the type of the first projection surface, output of a sound effect in synchronization with the image representing the input information;

a first projection device configured to:

acquire the image representing the input information from the control device; and project the image representing the input information onto the first projection surface; and a second projection device configured to:

acquire a specific image from the control device; and project the specific image onto a second projection surface different from the first projection surface.

11. The projection system according to claim 10, further comprising a speaker on a back side of the first projection surface.

12. A control device, comprising:

a central processing unit (CPU) configured to:

receive input information from a mobile terminal, wherein the input information is based on a user input on the mobile terminal, and the input information corresponds to a trajectory of the user input;

recognize, based on the input information, a character entered by a user of the mobile terminal; and control projection of an image onto a projection surface and output of a specific effect, such that the projection of the image follows an input of the input information, wherein the projection of the image and the output of the specific effect are based on a type of the projection surface, the image represents the trajectory of the user input, and the image includes a moving picture indicating a result of the recognition of the character.

* * * * *